(12) United States Patent
Ding et al.

(10) Patent No.: US 10,825,389 B2
(45) Date of Patent: Nov. 3, 2020

(54) PIXEL CONTROL CIRCUIT AND CONTROL METHOD, PIXEL UNIT, DISPLAY SUBSTRATE AND DEVICE

(71) Applicant: BOE Technology Group Co., Ltd., Beijing (CN)

(72) Inventors: Xiaoliang Ding, Beijing (CN); Xue Dong, Beijing (CN); Haisheng Wang, Beijing (CN); Yingming Liu, Beijing (CN); Chihjen Cheng, Beijing (CN); Yuzhen Guo, Beijing (CN); Pengpeng Wang, Beijing (CN); Xueyou Cao, Beijing (CN); Yanling Han, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/182,693

(22) Filed: Nov. 7, 2018

(65) Prior Publication Data
US 2019/0206318 A1 Jul. 4, 2019

(30) Foreign Application Priority Data
Jan. 2, 2018 (CN) .......................... 2018 1 0002495

(51) Int. Cl.
*G06F 3/041* (2006.01)
*G06F 3/045* (2006.01)
(Continued)

(52) U.S. Cl.
CPC ......... *G09G 3/3233* (2013.01); *G06F 3/0414* (2013.01); *G06F 3/0416* (2013.01);
(Continued)

(58) Field of Classification Search
CPC ...... G06K 9/0004; G06F 3/044; G06F 3/0412
See application file for complete search history.

(56) References Cited

U.S. PATENT DOCUMENTS

2004/0130335 A1* 7/2004 Shimizu ............... G06K 9/0002
324/661
2005/0099372 A1 5/2005 Nakamura et al.
(Continued)

FOREIGN PATENT DOCUMENTS

CN 203503280 U 3/2014
CN 104269142 A 1/2015
(Continued)

OTHER PUBLICATIONS

First office action of Chinese application No. 201810002495.X dated Jun. 25, 2019.

*Primary Examiner* — Nan-Ying Yang
(74) *Attorney, Agent, or Firm* — Fay Sharpe LLP

(57) ABSTRACT

A pixel control circuit and control method, a pixel unit, a display substrate and device are provided. The pixel control circuit includes: a pressure detecting sub-circuit and a switching sub-circuit; the pressure detecting sub-circuit is connected to a control node, and configured to control a potential of the control node to be a first potential when a pressure signal is detected; and the switching sub-circuit is connected to a first power source terminal, a light-emitting sub-circuit in the pixel unit and the control node respectively, and configured to provide a first power source signal from the first power source terminal for the light-emitting sub-circuit when the potential of the control node is the first potential. The pixel control circuit effectively raises the speed of fingerprint detection.

11 Claims, 13 Drawing Sheets

(51) Int. Cl.
*G09G 3/3233* (2016.01)
*G06K 9/00* (2006.01)
(52) U.S. Cl.
CPC ... G06K 9/0004 (2013.01); *G09G 2300/0823* (2013.01); *G09G 2310/08* (2013.01)

(56) References Cited

U.S. PATENT DOCUMENTS

| | | | |
|---|---|---|---|
| 2005/0213799 A1* | 9/2005 | Sawano | G06K 9/0002 382/124 |
| 2007/0109879 A1* | 5/2007 | Mabuchi | H04N 5/357 365/190 |
| 2017/0124370 A1* | 5/2017 | He | G06K 9/0012 |
| 2018/0151122 A1 | 5/2018 | Ding et al. | |
| 2019/0065811 A1 | 2/2019 | Cao et al. | |

FOREIGN PATENT DOCUMENTS

| | | |
|---|---|---|
| CN | 106598327 A | 4/2017 |
| CN | 107274831 A | 10/2017 |
| CN | 107526474 A | 12/2017 |
| KR | 20050045851 A | 5/2005 |

\* cited by examiner

PIXEL CONTROL CIRCUIT AND CONTROL METHOD, PIXEL UNIT, DISPLAY SUBSTRATE AND DEVICE

This application claims the priority to the Chinese Patent Application No. 201810002495.X, filed on Jan. 2, 2018 and titled "PIXEL CONTROL CIRCUIT AND CONTROL METHOD, PIXEL UNIT, DISPLAY SUBSTRATE AND DEVICE", the disclosure of which are incorporated herein by reference in its entirety.

TECHNICAL FIELD

The present disclosure relates to a pixel control circuit and control method, a pixel unit, a display substrate and device.

BACKGROUND

An Organic Light-Emitting Diode (OLED) display panel with a fingerprint recognition function includes a plurality of pixel units, each of which is provided with a light source, a photosensitive diode and a Thin Film Transistor (TFT) which are used for fingerprint detection. When a finger is pressed on the surface of a display panel corresponding to a pixel unit, the light source in the pixel unit begins to emit light. Due to the difference between a finger valley and a finger ridge, light emitted by the light source will be reflected differently when it irradiates on the valley and ridge, such that a difference in light intensity reflected to the photosensitive diode in the pixel unit occurs, and the photosensitive diode generates different magnitudes of current according to the difference in light intensity. Thus, the ridge and valley may be detected through detecting the different magnitudes of current, thereby realizing the detection of fingerprint.

In the related art, a touch Integrated Circuit (IC) is further provided in the display panel. When the finger is pressed on the surface of the display panel corresponding to the pixel unit, the display panel may generate touch signal according to the pressing operation of the finger, and sends the touch signal to the touch IC. The touch IC may locate the pixel unit pressed by the finger according to the touch signal and turn on the light source in the pixel unit according to the locating result.

However, it takes a certain processing time to send the touch signal to the touch IC, and locate and turn on the light source in the corresponding pixel unit by the touch IC. Therefore, the speed of fingerprint detection is influenced.

SUMMARY

The present disclosure provides a pixel control circuit and control method, a pixel unit, a display substrate and device.

According to an aspect of the present disclosure, there is provided a pixel control circuit applied in a pixel unit, comprising: a pressure detecting sub-circuit and a switching sub-circuit;

wherein the pressure detecting sub-circuit is connected to a control node, and configured to control a potential of the control node to be a first potential when a pressure signal is detected; and the switching sub-circuit is connected to a first power source terminal, a light-emitting sub-circuit in the pixel unit and the control node respectively, and configured to provide a first power source signal from the first power source terminal to the light-emitting sub-circuit when the potential of the control node is the first potential.

Optionally, the pixel control circuit further comprises: a reset sub-circuit. The reset sub-circuit is connected to a reset signal terminal and the control node respectively, and configured to control the potential of the control node to be a second potential under the control of a reset signal from the reset signal terminal.

Optionally, the switching sub-circuit is further configured to prohibit from providing the first power source signal to the light-emitting sub-circuit under the control of the first power source signal when the potential of the control node is the second potential.

Optionally, the pressure detecting sub-circuit comprises: a pressure sensor, a terminal of the pressure sensor is connected to the control node and the other terminal of the pressure sensor is connected to a second power source terminal.

Optionally, the switching sub-circuit is further connected to a second power source terminal, and the switching sub-circuit comprises: a first transistor, a second transistor, a third transistor and a fourth transistor;

a gate electrode of the first transistor is connected to the control node, a first electrode of the first transistor is connected to the first power source terminal, and a second electrode of the first transistor is connected to a gate electrode of the third transistor;

a gate electrode of the second transistor is connected to the control node, a first electrode of the second transistor is connected to a second power source terminal, and a second electrode of the second transistor is connected to the gate electrode of the third transistor;

a first electrode of the third transistor is connected to the second electrode of the second transistor, and a second electrode of the third transistor is connected to a gate electrode of the fourth transistor;

a first electrode of the fourth transistor is connected to the first power source terminal, and a second electrode of the fourth transistor is connected to the light-emitting sub-circuit; and the first transistor, the third transistor and the fourth transistor have the same polarity, and the first transistor and the second transistor have opposite polarities.

Optionally, the switching sub-circuit is further connected to a second power source terminal, and the switching sub-circuit comprises: a first transistor, a fifth transistor, a third transistor and a fourth transistor;

a gate electrode of the first transistor is connected to the control node, a first electrode of the first transistor is connected to the first power source terminal, and a second electrode of the first transistor is connected to a gate electrode of the third transistor;

a gate electrode and a first electrode of the fifth transistor are connected to the second power source terminal, and a second electrode of the fifth transistor is connected to the gate electrode of the third transistor;

a first electrode of the third transistor is connected to the second electrode of the fifth transistor, and a second electrode of the third transistor is connected to a gate electrode of the fourth transistor;

a first electrode of the fourth transistor is connected to the first power source terminal, and a second electrode of the fourth transistor is connected to the light-emitting sub-circuit; and the first transistor, the fifth transistor, the third transistor and the fourth transistor have the same polarity.

Optionally, the reset sub-circuit comprises: a sixth transistor; a gate electrode of the sixth transistor is connected to the reset signal terminal, a first electrode of the sixth transistor is connected to a second power source terminal, and a second electrode of the sixth transistor is connected to the control node.

Optionally, the pixel control circuit further comprises: a capacitor; wherein a terminal of the capacitor is connected to the control node, and the other terminal of the capacitor is connected to a second power source terminal.

Optionally, the pixel control circuit comprises: a pressure sensor, a first transistor, a second transistor, a third transistor, a fourth transistor, a sixth transistor, and a capacitor;

wherein a terminal of the pressure sensor is connected to the control node, and the other terminal of the pressure sensor is connected to a second power source terminal;

a gate electrode of the first transistor is connected to the control node, a first electrode of the first transistor is connected to the first power source terminal, and a second electrode of the first transistor is connected to a gate electrode of the third transistor;

a gate electrode of the second transistor is connected to the control node, a first electrode of the second transistor is connected to the second power source terminal, and a second electrode of the second transistor is connected to the gate electrode of the third transistor;

a first electrode of the third transistor is connected to the second electrode of the second transistor, and a second electrode of the third transistor is connected to a gate electrode of the fourth transistor;

a first electrode of the fourth transistor is connected to the first power source terminal, and a second electrode of the fourth transistor is connected to the light-emitting sub-circuit;

a gate electrode of the sixth transistor is connected to a reset signal terminal, a first electrode of the sixth transistor is connected to the second power source terminal, and a second electrode of the sixth transistor is connected to the control node;

a terminal of the capacitor is connected to the control node, and the other terminal of the capacitor is connected to the second power source terminal; and the first transistor, the third transistor and the fourth transistor have the same polarity, and the first transistor and the second transistor have opposite polarities.

Optionally, the pixel control circuit comprises: a pressure sensor, a first transistor, a fifth transistor, a third transistor, a fourth transistor, a sixth transistor, and a capacitor;

wherein a terminal of the pressure sensor is connected to the control node, and the other terminal of the pressure sensor is connected to a second power source terminal;

a gate electrode of the first transistor is connected to the control node, a first electrode of the first transistor is connected to the first power source terminal, and a second electrode of the first transistor is connected to a gate electrode of the third transistor;

a gate electrode and a first electrode of the fifth transistor are connected to the second power source terminal, and a second electrode of the fifth transistor is connected to the gate electrode of the third transistor;

a first electrode of the third transistor is connected to the second electrode of the fifth transistor, and a second electrode of the third transistor is connected to a gate electrode of the fourth transistor;

a first electrode of the fourth transistor is connected to the first power source terminal, and a second electrode of the fourth transistor is connected to the light-emitting sub-circuit;

a gate electrode of the sixth transistor is connected to a reset signal terminal, a first electrode of the sixth transistor is connected to the second power source terminal, and a second electrode of the sixth transistor is connected to the control node;

a terminal of the capacitor is connected to the control node, and the other terminal of the capacitor is connected to the second power source terminal; and the first transistor, the fifth transistor, the third transistor and the fourth transistor have the same polarity.

According to another aspect of the present disclosure, there is provided a control method of a pixel control circuit, for controlling a pixel control circuit, wherein the pixel control circuit comprises: a pressure detecting sub-circuit and a switching sub-circuit, the method comprising:

in a fingerprint detection phase, detecting a pressure signal for fingerprint detection by the pressure detecting sub-circuit, controlling a potential of a control node to be a first potential according to the pressure signal by the pressure detecting sub-circuit, and, providing, by the switching sub-circuit, a first power source signal from a first power source terminal to a light-emitting sub-circuit under the control of the control node, a potential of the first power source signal being the first potential.

Optionally, the control method further comprises: in a reset phase, a potential of a reset signal output from a reset signal terminal being a second potential and the potential of the first power source signal being the first potential, controlling, by the reset sub-circuit, the potential of the control node to be the second potential under the control of the reset signal.

Optionally, the control method further comprises: prohibiting, by the switching sub-circuit, from providing the first power source signal to the light-emitting sub-circuit under the control of the control node and the first power source signal.

According to yet another aspect of the present disclosure, there is provided a pixel unit, comprising: a pixel drive circuit, a light-emitting sub-circuit and a pixel control circuit, wherein the pixel drive circuit and the pixel control circuit are respectively connected to the light-emitting sub-circuit;

the pixel control circuit comprises: a pressure detecting sub-circuit and a switching sub-circuit;

the pressure detecting sub-circuit is connected to a control node, and configured to control a potential of the control node to be a first potential when a pressure signal is detected; and the switching sub-circuit is connected to a first power source terminal, the light-emitting sub-circuit in the pixel unit and the control node respectively, and configured to provide a first power source signal from the first power source terminal for the light-emitting sub-circuit when the potential of the control node is the first potential.

Optionally, the pixel control circuit further comprises: a reset sub-circuit connected to a reset signal terminal and the control node respectively and configured to control the potential of the control node to be a second potential under the control of a reset signal from the reset signal terminal.

Optionally, the switching sub-circuit is further configured to prohibit from providing the first power source signal to the light-emitting sub-circuit under the control of the first power source signal when the potential of the control node is the second potential.

Optionally, the pressure detecting sub-circuit comprises: a pressure sensor, a terminal of the pressure sensor is connected to the control node and the other terminal of the pressure sensor is connected to a second power source terminal.

Optionally, the pixel drive circuit comprises: a seventh transistor, an eighth transistor, a ninth transistor, a tenth transistor, an eleventh transistor and a twelfth transistor;

a gate electrode of the seventh transistor is connected to a control signal line, a first electrode of the seventh transistor is connected to a second power source terminal, and a second electrode of the seventh transistor is connected to a first node;

a gate electrode of the eighth transistor is connected to the first node, a first electrode of the eighth transistor is connected to a first power source terminal, and a second electrode of the eighth transistor is connected to a third node;

a gate electrode of the ninth transistor is connected to a gate line, and a first electrode of the ninth transistor is connected to a data line, a second electrode of the ninth transistor is connected to a second node, and the second node is coupled with the third node;

a gate electrode of the tenth transistor is connected to the gate line, a first electrode of the tenth transistor is connected to the third node, and a second electrode of the tenth transistor is connected to the first node;

a gate electrode of the eleventh transistor is connected to a second light-emitting signal line, a first electrode of the eleventh transistor is connected to the first power source terminal, and a second electrode of the eleventh transistor is connected to the second node;

a gate electrode of the twelfth transistor is connected to a first light-emitting signal line, a first electrode of the twelfth transistor is connected to the third node, and a second electrode of the twelfth transistor is connected to the light-emitting sub-circuit; and the seventh transistor, the eighth transistor, the ninth transistor, the tenth transistor, the eleventh transistor and the twelfth transistor have the same polarity.

According to still yet another aspect of the present disclosure, there is provided a display substrate, comprising: a plurality of the pixel units in the first aspect.

According to still yet another aspect of the present disclosure, there is provided a display device, comprising: the display substrate in the above aspect.

According to still yet another aspect of the present disclosure, there is provided a storage medium, comprising computer programs therein, wherein the computer programs, when executed by a processor, implement the control method of a pixel control circuit described in the another aspect.

DETAILED DESCRIPTION

Figure 1:
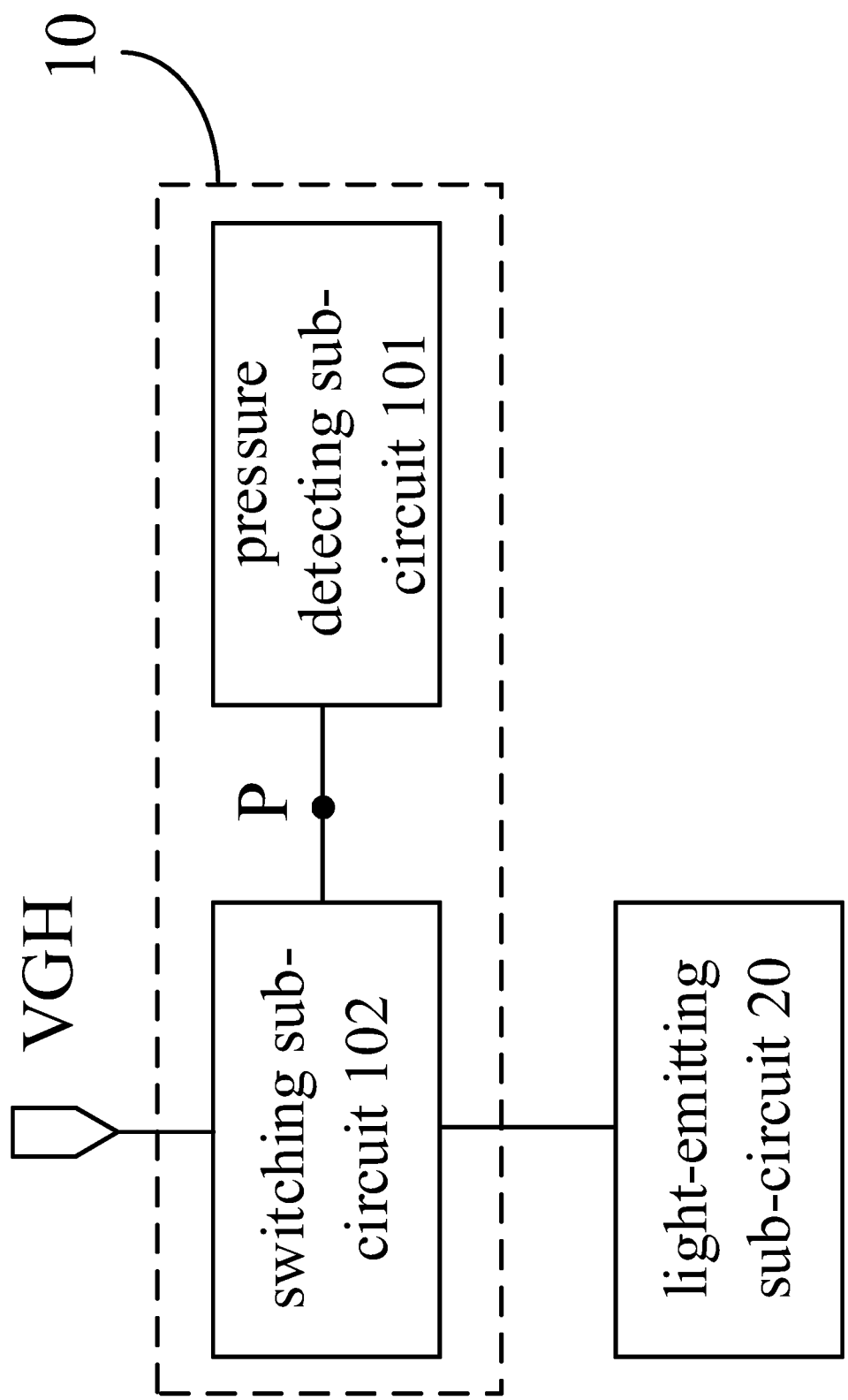
FIG. 1 is a schematic diagram of a structure of a pixel control circuit according to an embodiment of the present disclosure.

The embodiments of the present disclosure will be described in further detail with reference to the enclosed drawings, to make the principles and advantages of the present disclosure clearer.

Transistors adopted in all embodiments of the present disclosure may be thin-film transistors, field-effect transistors or other devices having the same characteristics. According to the function in a circuit, the transistors adopted in the embodiments of the present disclosure are generally switching transistors. Since the source electrode and drain electrode of a switching transistor adopted herein are symmetric, the source electrode and drain electrode may be exchanged. In the embodiments of the present disclosure, the source electrode is referred to as a first electrode and the drain electrode is referred to as a second electrode. According to form in the drawings, it is specified that a middle terminal of a transistor is the gate electrode, a signal input terminal is the source electrode, and a signal output terminal is the drain electrode. In addition, the switching transistors adopted in the embodiments of the present disclosure may include P-type switching transistors and N-switch type transistors. The P-type switching transistor is turned on when the gate electrode is at a low potential, and is turned off when the gate electrode is at a high potential. The N-type switching transistor is turned on when the gate electrode is at a high potential, and is turned off when the gate electrode is at a low potential. Additionally, in the embodiments of the present disclosure, a plurality of signals have a first potential and a second potential. The first potential and the second potential only indicate that the potential of the signal has two different state quantities, instead of indicating that the first potential or the second potential herein in this specification has a specific value.

In the following embodiments of the present disclosure, the first potential being a high potential relative to the second potential is taken as an example for illustration.

FIG. 1 is a schematic diagram of a structure of a pixel control circuit according to an embodiment of the present disclosure. The pixel control circuit may be applied in a pixel unit. As shown in FIG. 1, the pixel control circuit 10 may include: a pressure detecting sub-circuit 101 and a switching sub-circuit 102.

The pressure detecting sub-circuit 101 is connected to a control node P. The pressure detecting sub-circuit 101 is configured to control a potential of the control node P to be a first potential when a pressure signal is detected. For example, when the pressure detecting sub-circuit 101 detects a pressure signal generated by pressing a display panel by a finger, the pressure detecting sub-circuit 101 may control the potential of the control node P to be the first potential.

The switching sub-circuit 102 is connected to a first power source terminal VGH, a light-emitting sub-circuit 20 in the pixel unit 10 and the control node P respectively. The switching sub-circuit 102 is configured to provide a first power source signal from the first power source terminal VGH to the light-emitting sub-circuit 20 when the potential of the control node P is the first potential, to cause the light-emitting sub-circuit 20 to emit light.

In summary, with the pixel control circuit in the embodiment of the present disclosure, a pressure signal is detected by the pressure detecting sub-circuit, and a first power source signal is provided to the light-emitting sub-circuit by controlling the switching sub-circuit when the pressure signal is detected such that the light-emitting sub-circuit emits light. Compared with the related art, the light-emitting sub-circuit can be controlled to emit light only when the surface of the display panel corresponding to a pixel unit is pressed by a finger, and the light-emitting sub-circuit emits light without the control of the touch IC, thereby greatly improving the speed of fingerprint detection.

Figure 2:
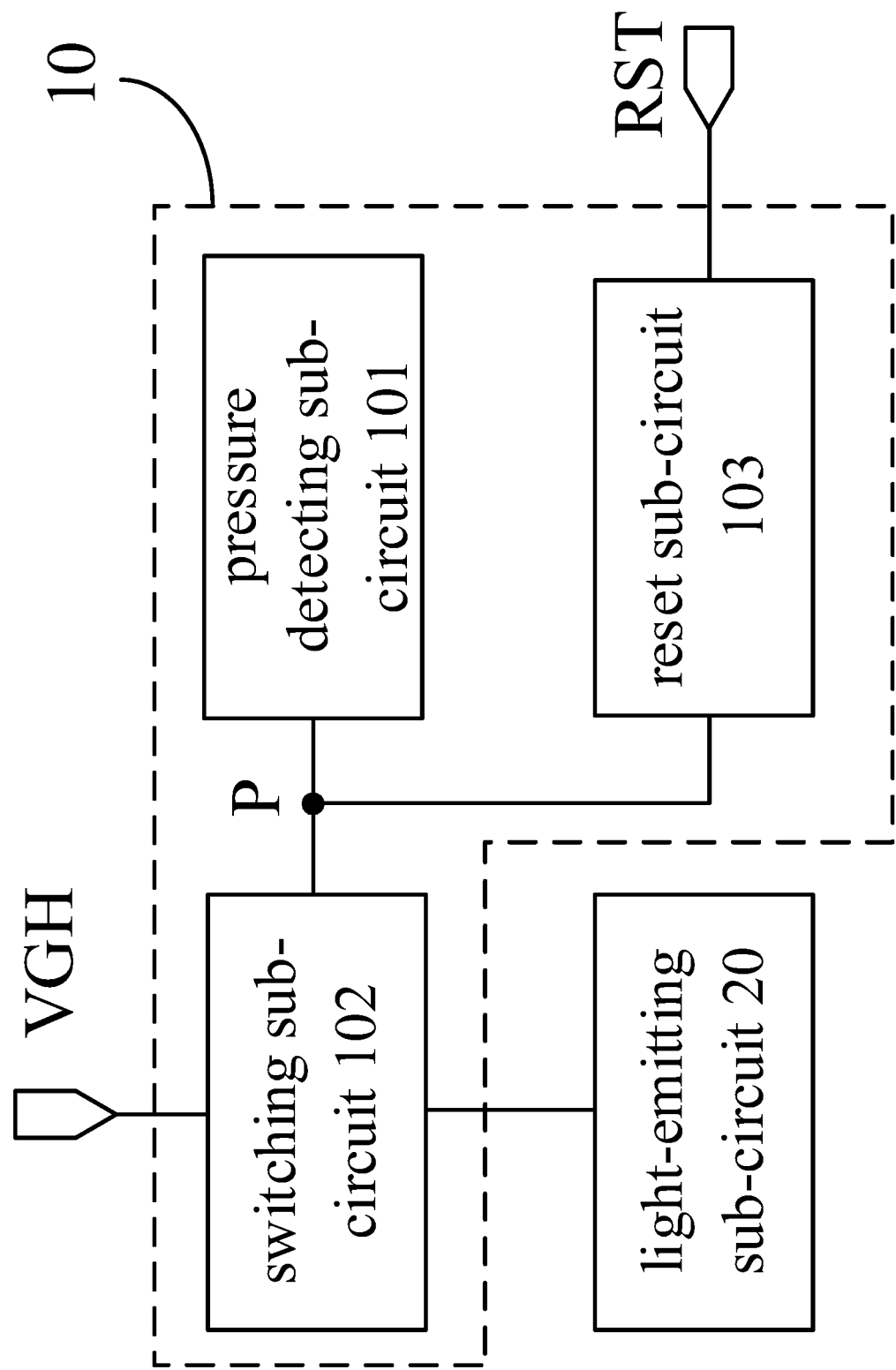
FIG. 2 is a schematic diagram of a structure of another pixel control circuit according to an embodiment of the present disclosure.

FIG. 2 is a schematic diagram of a structure of another pixel control circuit according to an embodiment of the present disclosure. As shown in FIG. 2, the pixel control circuit 10 may further include: a reset sub-circuit 103. The reset sub-circuit 103 is connected to a reset signal terminal RST and the control node P respectively. The reset sub-circuit 103 is configured to control the potential of the control node P to be a second potential under the control of a reset signal from the reset signal terminal RST. For example, when the potential of the reset signal is the second potential, the reset sub-circuit 103 is configured to control the potential of the control node P to be the second potential under the control of the reset signal.

Correspondingly, the switching sub-circuit 102 is further configured to prohibit the input of the first power source signal to the light-emitting sub-circuit 20 under the control of the first power source signal and the control node P when the potential of the control node P is the second potential.

In an implementation, when the finger leaves the surface of the display panel corresponding to the pixel unit, the display panel may send a touch signal to the reset signal terminal RST. After receiving the touch signal, the reset signal terminal RST can output a reset signal at the second potential. The reset sub-circuit 103 can control the potential of the control node P to be the second potential according to the reset signal. The switching sub-circuit 102 prohibits the input of the first power source signal to the light-emitting sub-circuit 20 under the control of the control node P at the second potential and the first power source signal, such that the light-emitting sub-circuit stops emitting light for fingerprint detection.

Optionally, the functions of the switching sub-circuit 102 may be implemented in various implementing ways, and are illustrated in following two implementing ways in the embodiments of the present disclosure.

Figure 3:
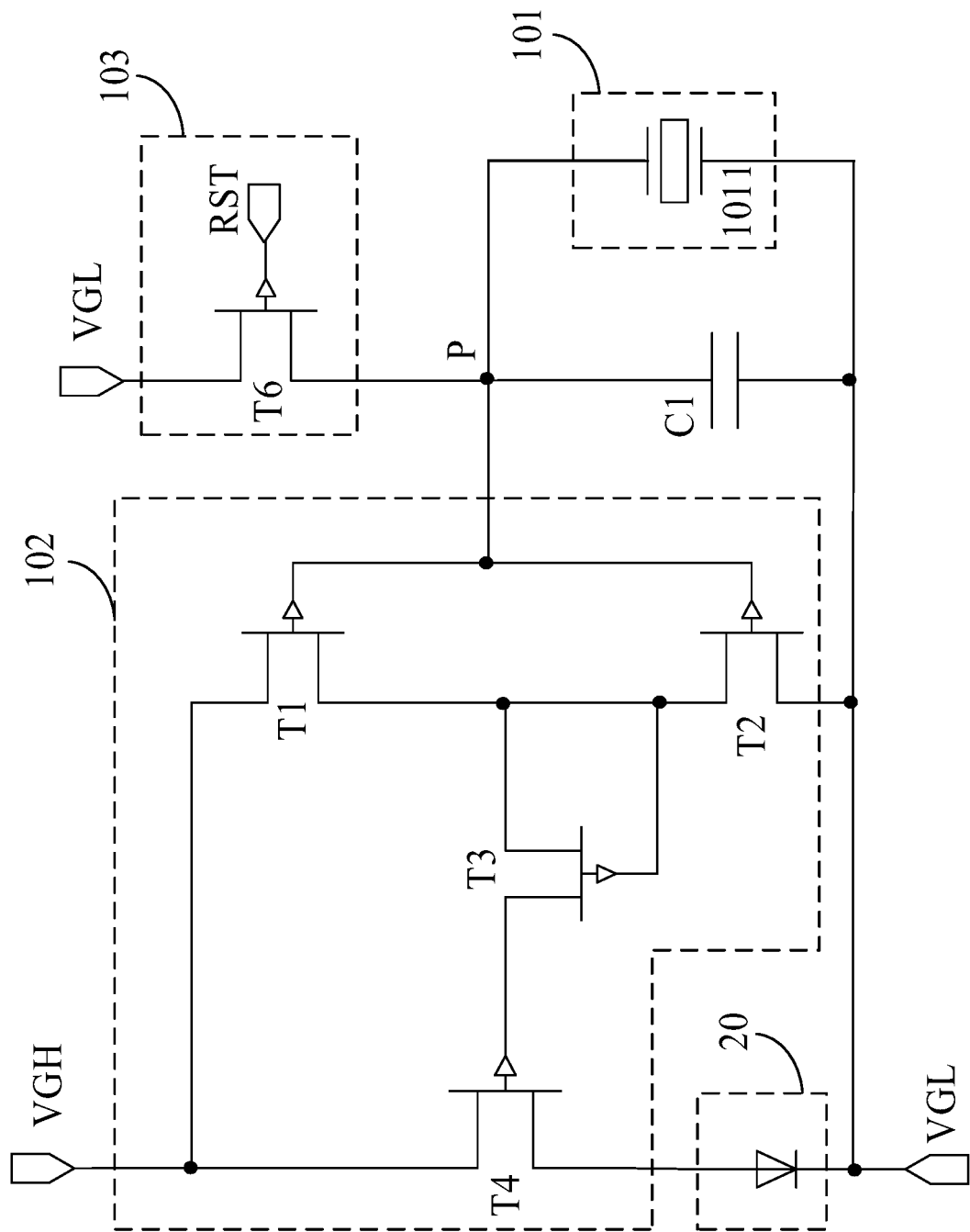
FIG. 3 is a schematic diagram of a structure of yet another pixel control circuit according to an embodiment of the present disclosure.

In a first implementing way, FIG. 3 is a schematic diagram of a structure of the switching sub-circuit 102. As shown in FIG. 3, the switching sub-circuit 102 may include: a first transistor T1, a second transistor T2, a third transistor T3 and a fourth transistor T4.

The gate electrode of the first transistor T1 is connected to the control node P, the first electrode of the first transistor T1 is connected to the first power source terminal VGH, and the second electrode of the first transistor T1 is connected to the gate electrode of the third transistor T3.

The gate electrode of the second transistor T2 is connected to the control node P, the first electrode of the second transistor T2 is connected to a second power source terminal VGL, and the second electrode of the second transistor T2 is connected to the gate electrode of the third transistor T3.

The first electrode of the third transistor T3 is connected to the second electrode of the second transistor T2, and the second electrode of the third transistor T3 is connected to the gate electrode of the fourth transistor T4.

The first electrode of the fourth transistor T4 is connected to the first power source terminal VGH, and the second electrode of the fourth transistor T4 is connected to the light-emitting sub-circuit 20.

In the first implementing way, the first transistor T1, the third transistor T3 and the fourth transistor T4 have the same polarity, and the first transistor T1 and the second transistor T2 have opposite polarities. For example, as shown in FIG. 3, all of the first transistor T1, the third transistor T3 and the fourth transistor T4 are P-type transistors, and the second transistor T2 is an N-type transistor.

Figure 4:
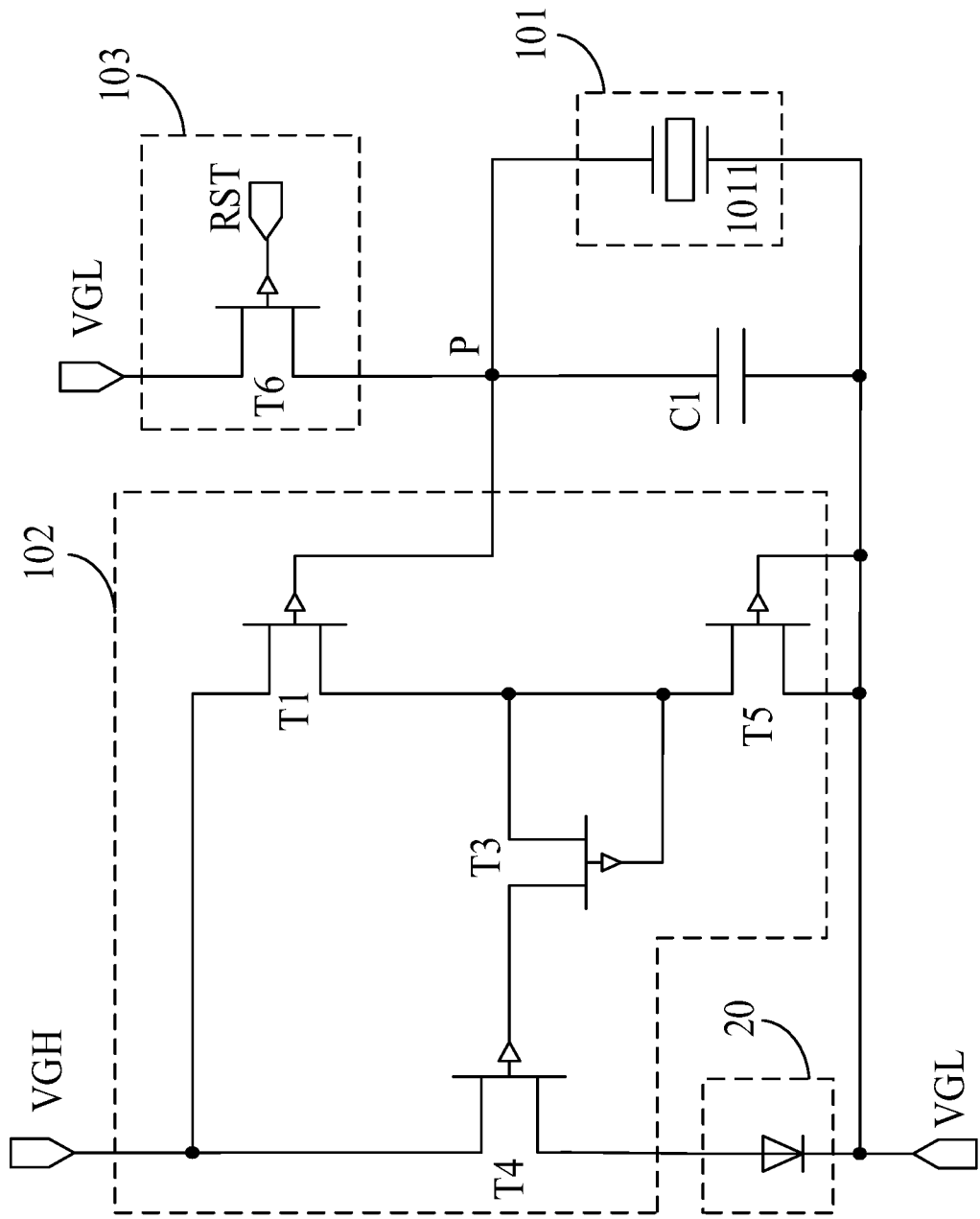
FIG. 4 is a schematic diagram of a structure of still yet another pixel control circuit according to an embodiment of the present disclosure.

In a second implementing way, FIG. 4 is a schematic diagram of a structure of the switching sub-circuit 102. As shown in FIG. 4, the switching sub-circuit 102 may include: a first transistor T1, a fifth transistor T5, a third transistor T3 and a fourth transistor T4.

The gate electrode of the first transistor T1 is connected to the control node P, the first electrode of the first transistor T1 is connected to the first power source terminal VGH, and the second electrode of the first transistor T1 is connected to the gate electrode of the third transistor T3.

The gate electrode and the first electrode of the fifth transistor T5 are connected to the second power source terminal VGL, and the second electrode of the fifth transistor T5 is connected to the gate electrode of the third transistor T3.

The first electrode of the third transistor T3 is connected to the second electrode of the fifth transistor T5, and the second electrode of the third transistor T3 is connected to the gate electrode of the fourth transistor T4.

The first electrode of the fourth transistor T4 is connected to the first power source terminal VGH, and the second electrode of the fourth transistor T4 is connected to the light-emitting sub-circuit 20.

In the second implementing way, the first transistor T1, the fifth transistor T5, the third transistor T3 and the fourth transistor T4 have the same polarity. For example, as shown in FIG. 4, all of the first transistor T1, the fifth transistor T5, the third transistor T3 and the fourth transistor T4 are P-type transistors.

Generally, the manufacture process for an OLED is a P-type manufacture process. Therefore, when all of the first transistor T1, the fifth transistor T5, the third transistor T3 and the fourth transistor T4 are P-type transistors, the manufacture processes for the first transistor T1, the fifth transistor T5, the third transistor T3 and the fourth transistor T4 and the manufacture process for the OLED are all P-type manufacture processes, which can simplify the process for manufacturing the switching sub-circuit 102.

Please refer to FIG. 3 and FIG. 4, the pressure detecting sub-circuit 101 may include: a pressure sensor 1011. A terminal of the pressure sensor 1011 is connected to the control node P and the other terminal of the pressure sensor 1011 is connected to the second power source terminal VGL.

With continued reference to FIG. 3 and FIG. 4, the reset sub-circuit 103 may include: a sixth transistor T6. The gate electrode of the sixth transistor T6 is connected to the reset signal terminal RST, the first electrode of the sixth transistor T6 is connected to the second power source terminal VGL, and the second electrode of the sixth transistor T6 is connected to the control node P.

With continued reference to FIG. 3 and FIG. 4, the pixel control circuit 10 may further include: a capacitor C1. A terminal of the capacitor C1 is connected to the control node P, and the other terminal of the capacitor C1 is connected to the second power source terminal VGL. The capacitor C1 can be used to stabilize the voltage of the control node P.

Figure 5:
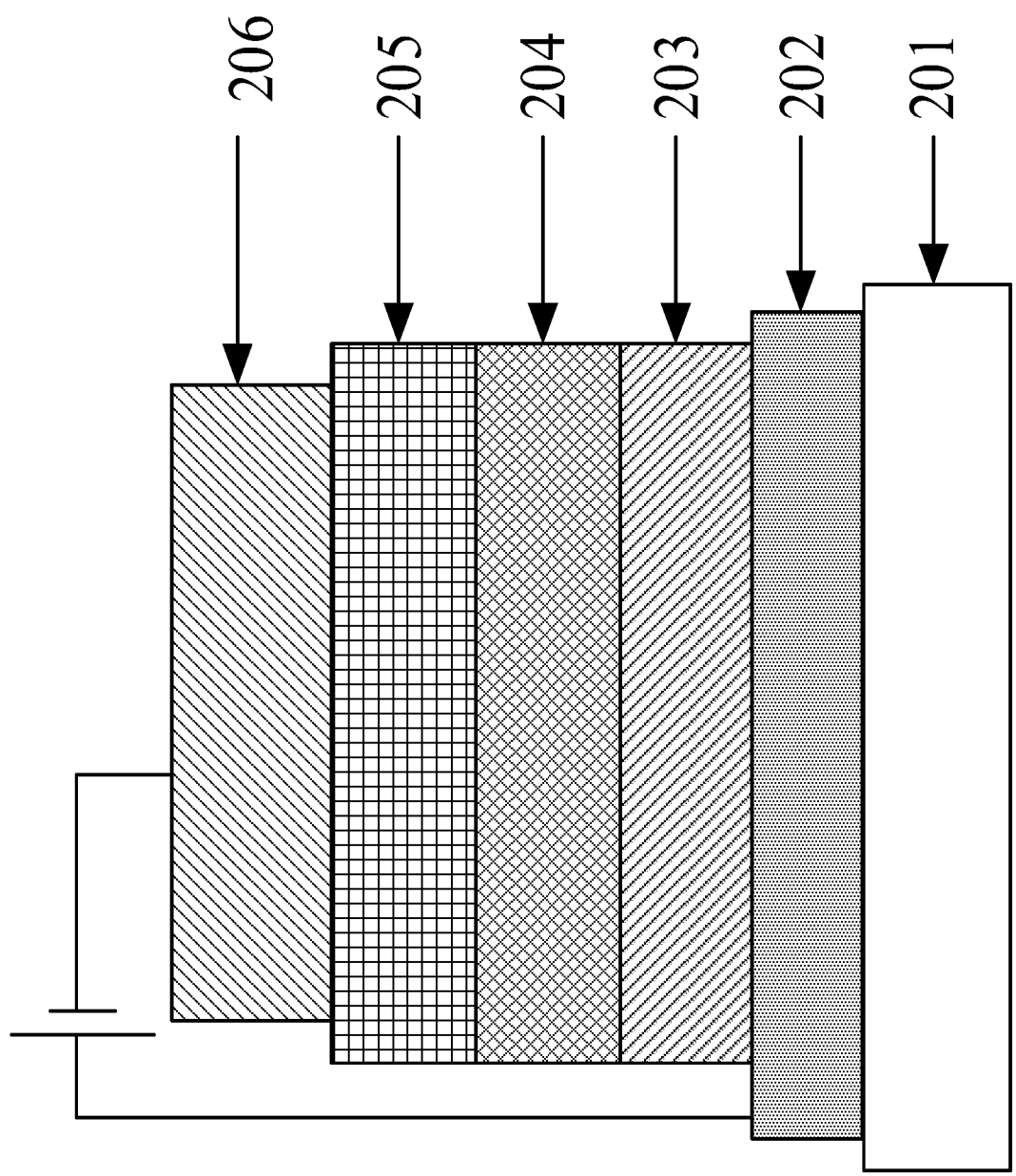
FIG. 5 is a schematic diagram of a structure of an OLED according to an embodiment of the present disclosure.

Optionally, the light-emitting sub-circuit 20 may include an OLED. FIG. 5 is a schematic diagram of a structure of the OLED. As shown in FIG. 5, the OLED may include: an anode 202, a hole-transport layer 203, a light-emitting layer 204, an electron-transport layer 205 and a cathode 206 sequentially disposed on a base substrate 201. By applying a voltage to the anode 202 and the cathode 206 respectively, a current can be generated in the OLED under the action of the voltage, thereby achieving the light emission of the light-emitting layer 204. Herein, the anode 202 may be made of Indium Tin Oxide (ITO).

In summary, with the pixel control circuit in the embodiments of the present disclosure, a pressure signal is detected by the pressure detecting sub-circuit, and a first power source signal is provided to the light-emitting sub-circuit by controlling the switching sub-circuit when the pressure signal is detected such that the light-emitting sub-circuit emits light. Compared with the related art, the light-emitting sub-circuit can be controlled to emit light only when the surface of the display panel corresponding to a pixel unit is pressed by a finger, and the light-emitting sub-circuit emits light without the control of the touch IC, thereby greatly improving the speed of fingerprint detection.

The embodiments of the present disclosure further provide a control method of a pixel control circuit 10. The method may be used to control the pixel control circuit 10 shown in any of FIG. 1 to FIG. 4. The method may include: a fingerprint detection phase.

In the fingerprint detection phase, the pressure detecting sub-circuit 10 detects a pressure signal for fingerprint detection and the pressure detecting sub-circuit 10 controls the potential of the control node P to be the first potential according to the pressure signal. The switching sub-circuit 102 provides a first power source signal from the first power source terminal VGH for the light-emitting sub-circuit 20 under the control of the control node P to make the light-emitting sub-circuit 20 to emit light. The potential of the first power source signal is the first potential.

In summary, with control method of the pixel control circuit in the embodiments of the present disclosure, a first power source signal is provided for the light-emitting sub-circuit by controlling the switching sub-circuit when the pressure signal is detected such that the light-emitting sub-circuit emits light. Compared with the related art, the light-emitting sub-circuit can be controlled to emit light when the surface of the display panel corresponding to a pixel unit is pressed by a finger, and the light-emitting sub-circuit emits light without the control of the touch IC, thereby greatly improving the speed of fingerprint detection.

Optionally, the control method of the pixel control circuit 10 may further include a reset phase. In the reset phase, the potential of a reset signal output from the reset signal terminal RST is the second potential and the potential of the first power source signal is the first potential. The reset sub-circuit 103 controls the potential of the control node P to be the second potential under the control of the reset signal. The switching sub-circuit 102 prohibits the input of the first power source signal to the light-emitting sub-circuit 20 under the control of the control node P and the first power source signal, such that the light-emitting sub-circuit 20 stops emitting light.

Exemplarily, the pixel control circuit 10 shown in FIG. 3 is taken as an example for illustration hereinafter, to introduce the driving principle of the pixel control circuit 10 in the embodiments of the present disclosure in detail. In the pixel control circuit 10, all of the first transistor T1, the third transistor T3, and the fourth transistor T4 are P-type transistors, and the second transistor T2 is an N-type transistor. In the driving process, when a finger presses the surface of the display panel, the control method of the pixel control circuit 10 enters the fingerprint detection phase. When the finger leaves the surface of the display panel, the control method of the pixel control circuit 10 enters the reset phase.

Figure 6:
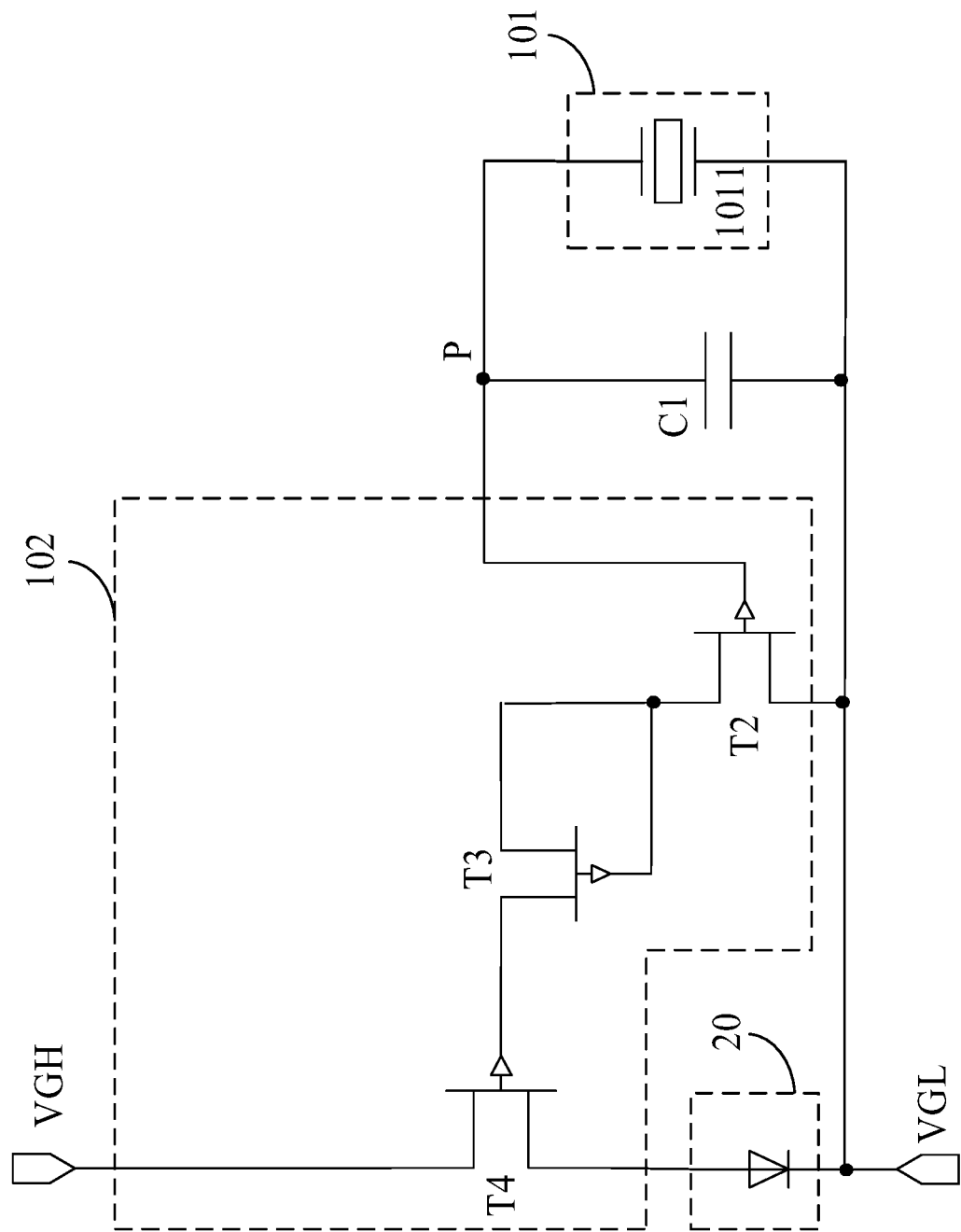
FIG. 6 is a schematic diagram of an equivalent circuit of a pixel control circuit in a fingerprint detection phase according to an embodiment of the present disclosure.

FIG. 6 is a schematic diagram of the pixel control circuit 10 when it's turned on during a fingerprint detection phase. In the fingerprint detection phase, the potential of the first power source signal output by the first power source terminal VGH is the first potential, and the potential of the second power source signal output by the second power source terminal VGL is the second potential. The pressing action of the finger on the surface of the display panel would generate a pressure signal, and the pressure sensor 1101 can detect the pressure signal. The pressure sensor 1101 can convert the pressure signal into an electric signal based on the piezoelectric principle, to control the potential of the control node P to be the first potential. As shown in FIG. 6, the second transistor T2 is turned on under the driving of the control node P. The second power source terminal VGL inputs the second power source signal to the gate electrode and the first electrode of the third transistor T3 respectively through the second transistor T2. The third transistor T3 is turned on under the control of the second power source signal, and the second power source signal is input to the gate electrode of the fourth transistor T4 through the third transistor T3. The fourth transistor T4 is turned on under the control of the second power source signal. The first power source terminal VGH inputs the first power source signal to the light-emitting sub-circuit 20 through the fourth transistor T4 and causes the light-emitting sub-circuit 20 to emit light. After the light irradiates on the finger and is reflected by the finger, the fingerprint detection component in the display panel can realize fingerprint detection according to the reflected light.

Figure 7:
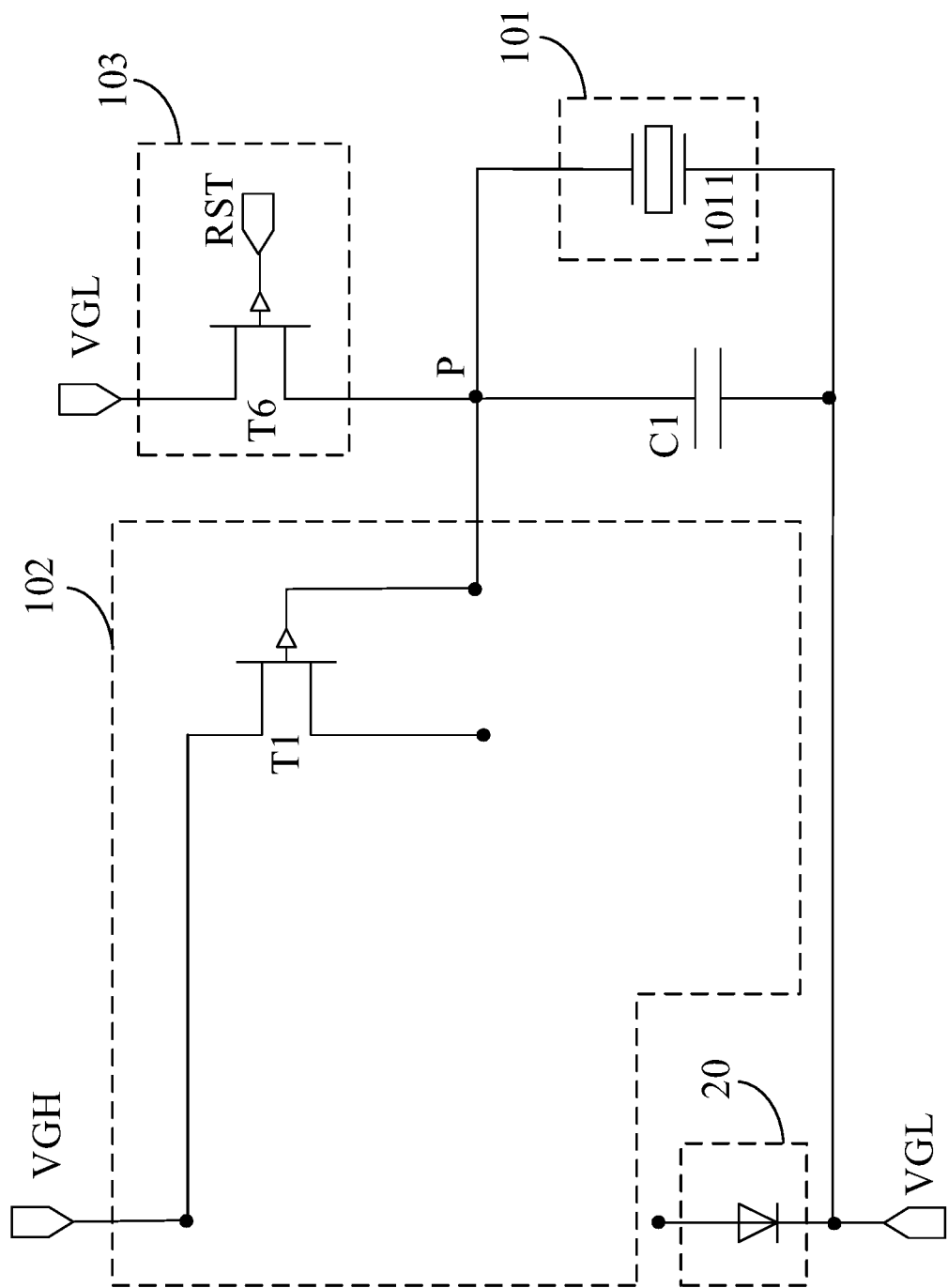
FIG. 7 is a schematic diagram of an equivalent circuit of a pixel control circuit in a reset phase according to an embodiment of the present disclosure.

FIG. 7 is a schematic diagram of the pixel control circuit 10 when it's turned on in a reset phase. In the reset phase, the potential of the first power source signal output by the first power source terminal VGH is the first potential, and the potential of the second power source signal output by the second power source terminal VGL is the second potential. When the finger leaves the surface of the display panel, the display panel can send a touch signal to the reset signal terminal RST. The reset signal terminal RST, after receiving the touch signal, may output a reset signal at the second potential. The sixth transistor T6 is turned on under the control of the reset signal, and the second power source terminal VGL inputs the second power source signal to the control node P through the sixth transistor T6. The first transistor T1 is turned on under the driving of the control node P. The first power source terminal VGH inputs the first power source signal to the gate electrode of the third transistor T3 through the first transistor T1 to turn off the third transistor T3, so as to prohibit from inputting the first power source signal to the light-emitting sub-circuit 20. Thus, the light-emitting sub-circuit stops emitting light for fingerprint detection. In addition, the second transistor T2 is also turned off under the action of the control node P, which can prevent other signals from affecting the gate electrode of the third transistor T3. Thus, the stability of controlling the third transistor T3 is improved.

In the display panel, whether the surface of the display panel is pressed by a finger is detected through a touch component in the display panel, and the display panel sends a trigger signal to the reset signal terminal RST according to the detection result of the touch component. Although there may be a certain delay in the process from detecting to sending the touch signal, the fingerprint detection process has been completed at this moment. Therefore, even if there is the delay in the process from detecting to sending the touch signal, the delay will not affect the speed of fingerprint detection, thereby ensuring the speed of fingerprint detection.

The driving principle of the pixel control circuit 10 shown in FIG. 4 is illustrated below. In the pixel control circuit 10, all of the first transistor T1, the fifth transistor T5, the third transistor T3 and the fourth transistor T4 are P-type transistors. The driving principle is as follows.

Figure 8:
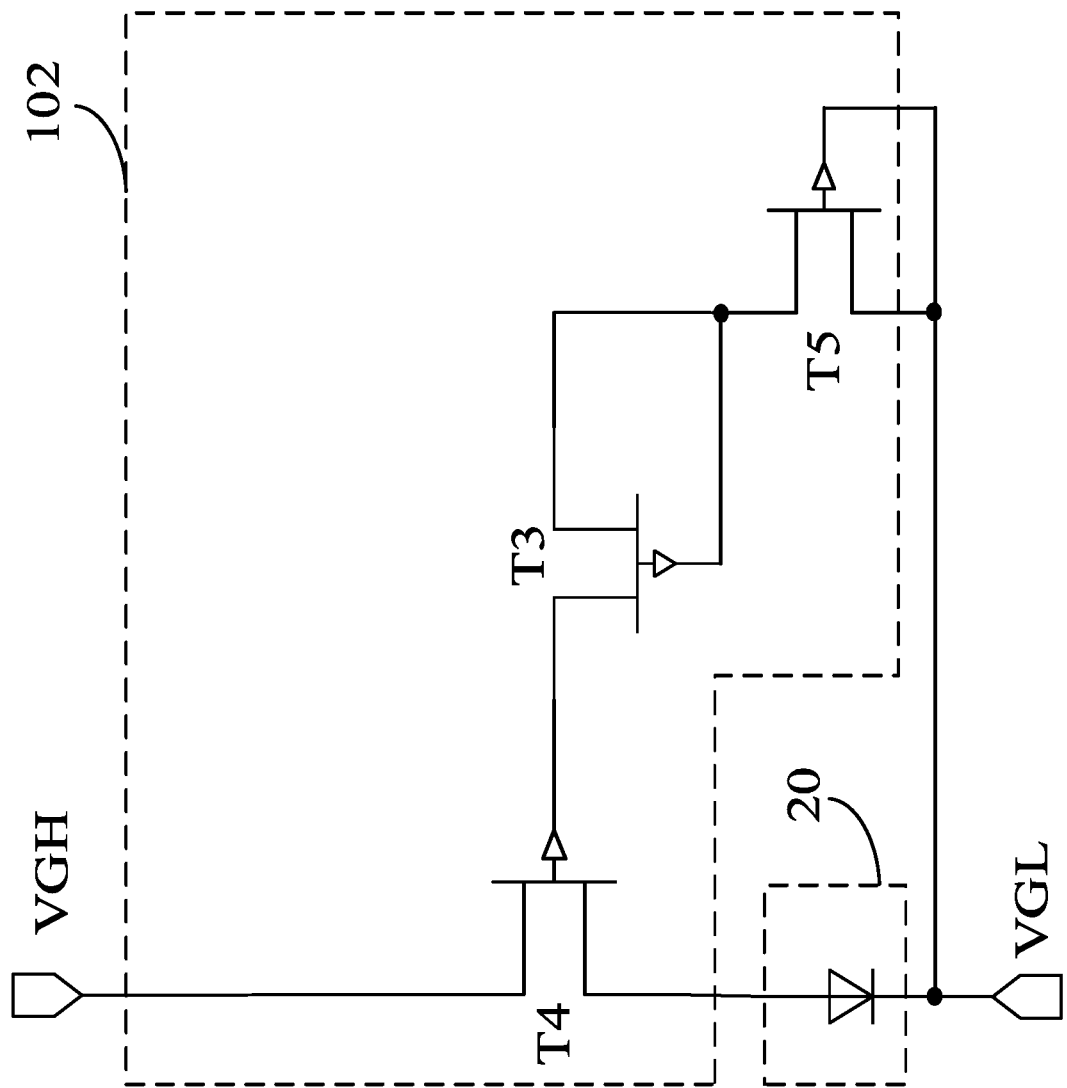
FIG. 8 is a schematic diagram of an equivalent circuit of another pixel control circuit in a fingerprint detection phase according to an embodiment of the present disclosure.

FIG. 8 is a schematic diagram of the pixel control circuit 10 when it's turned on in a fingerprint detection phase. In the fingerprint detection phase, the potential of the first power source signal output by the first power source terminal VGH is the first potential, and the potential of the second power source signal output by the second power source terminal VGL is the second potential. The fifth transistor T5 is turned on under the control of the second power source signal. The second power source terminal VGL inputs the second power source signal to the gate electrode and the first electrode of the third transistor T3 respectively through the fifth transistor T5. The third transistor T3 is turned on under the control of the second power source signal, and the second power source signal is input to the gate electrode of the fourth transistor T4 through the third transistor T3. The fourth transistor T4 is turned on under the control of the second power source signal. The first power source terminal VGH inputs the first power source signal to the light-emitting sub-circuit 20 through the fourth transistor T4, such that the light-emitting sub-circuit 20 is caused to emit light. After the light irradiates on the finger and is reflected by the finger, the fingerprint detection component in the display panel can realize fingerprint detection according to the reflected light.

FIG. 7 is a schematic diagram of the pixel control circuit 10 when it's turned on in a reset phase. In the reset phase, the potential of the reset signal output by the reset signal terminal RST is the second potential, the potential of the first power source signal output by the first power source terminal VGH is the first potential, and the potential of the second power source signal output by the second power source terminal VGL is the second potential. At this time, the sixth transistor T6 is turned on under the control of the reset signal, and the second power source terminal VGL inputs the second power source signal to the control node P through the sixth transistor T6. The first transistor T1 is turned on under the control of the control node P, and the first power source terminal VGH inputs the first power source signal to the gate electrode of the third transistor T3 through the first transistor T1. In addition, the fifth transistor T5 is turned on under the control of the second power source signal, and the second power source terminal VGL inputs the second power source signal to the gate electrode of the third transistor T3 through the fifth transistor T5. At this time, the first power source signal and the second power source signal are both input to the gate electrode of third transistor T3. Under the combined action of the two power source signals, the potential of the gate electrode of third transistor T3 cannot reach the condition for turning on the third transistor T3. That is, the third transistor T3 is turned off, so as to prohibit from inputting the first power source signal to the light-emitting sub-circuit 20.

Optionally, the first power source terminal and the second power source terminal may both be DC power source terminals, and the specific levels of signals output by the respective power source terminals and signal output terminals may be adjusted based on actual requirements of circuit. For example, the level of the first power source signal may be 8V, and the level of the second power source signal may be −8V, which is not limited in the embodiments of the present disclosure.

The above embodiments are illustrated by taking examples in which the first potential is a high potential relative to the second potential, and the first transistor T1, the third transistor T3, and the fourth transistor T4 are P-type transistors. Certainly, the first transistor T1, the third transistor T3, and the fourth transistor T4 may also adopt N-type transistors. When the first transistor T1, the third transistor T3, and the fourth transistor T4 adopt N-type transistors, the first potential may be a low potential relative to the second potential. The implementing process for the control method of the pixel control circuit may be made reference to the implementing process when the first transistor T1, the third transistor T3, and the fourth transistor T4 are P-type transistors, which is not repeated here.

In summary, with control method of the pixel control circuit in the embodiments of the present disclosure, a first power source signal is provided for the light-emitting sub-circuit by controlling the switching sub-circuit when the pressure signal is detected such that the light-emitting sub-circuit emits light. Compared with the related art, the light-emitting sub-circuit can be controlled to emit light when the surface of the display panel corresponding to a pixel unit is pressed by a finger, and the light-emitting sub-circuit emits light without the control of the touch IC, thereby greatly improving the speed of fingerprint detection.

Figure 9:
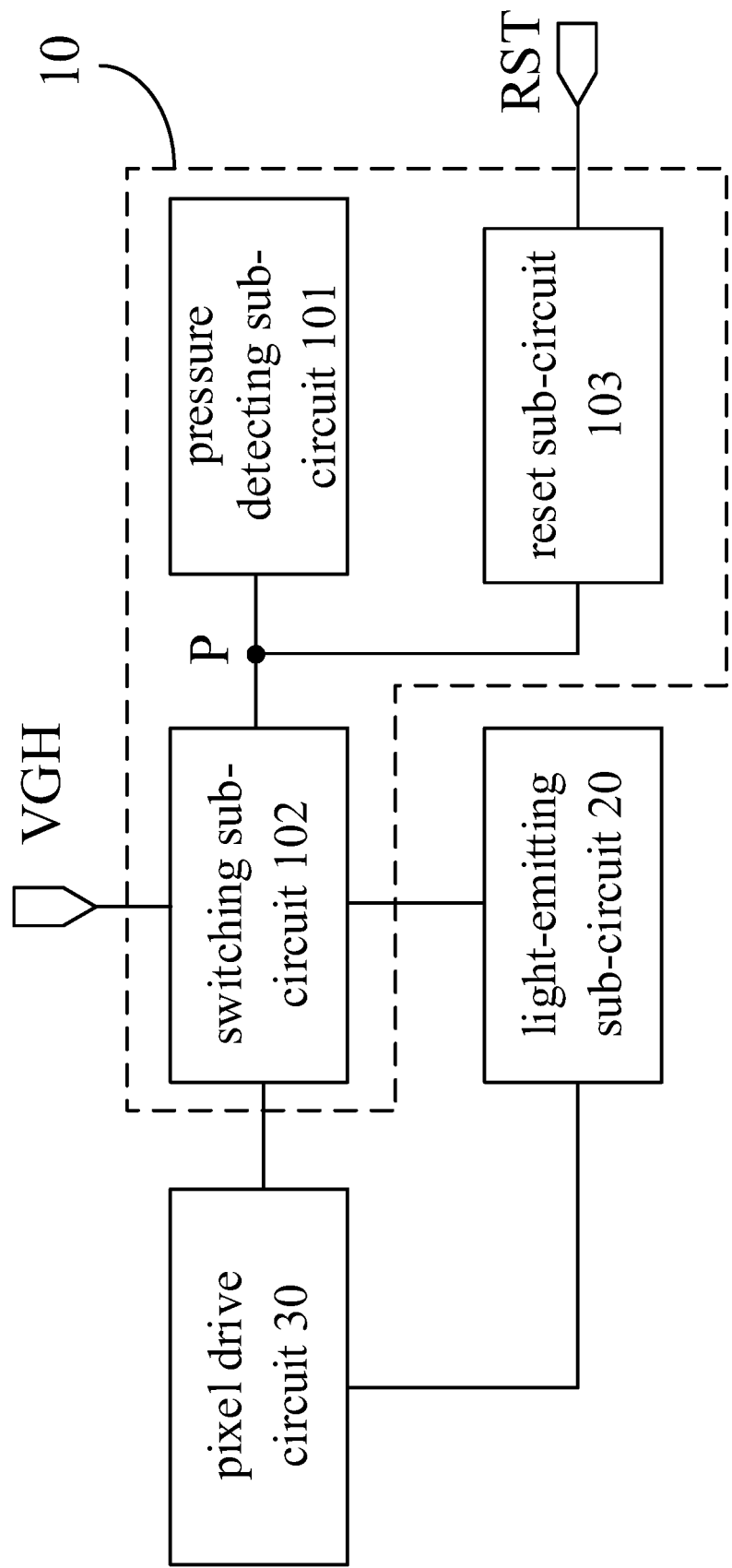
FIG. 9 is a schematic diagram of a structure of a pixel unit according to an embodiment of the present disclosure.

FIG. 9 is a schematic diagram of a structure of a pixel unit according to an embodiment of the present disclosure. As shown in FIG. 9, the pixel unit may include: a pixel drive circuit 30, a light-emitting sub-circuit 20 and the pixel control circuit 10 as provided in the embodiments of the present disclosure. The pixel drive circuit 30 and the pixel control circuit 10 are respectively connected to the light-emitting sub-circuit 20.

Figure 10:
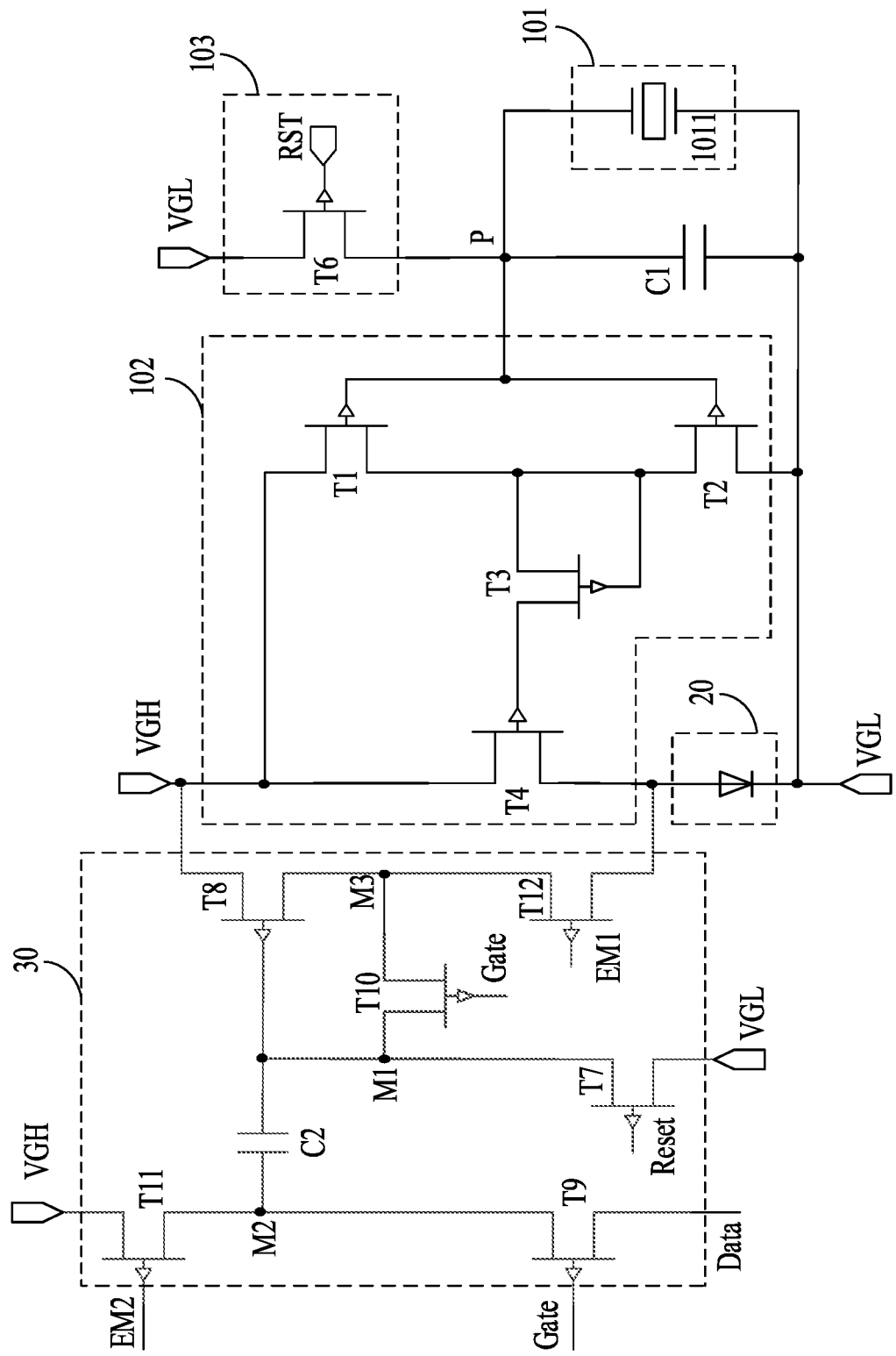
FIG. 10 is a schematic diagram of a structure of a pixel drive circuit according to an embodiment of the present disclosure.
Figure 11:
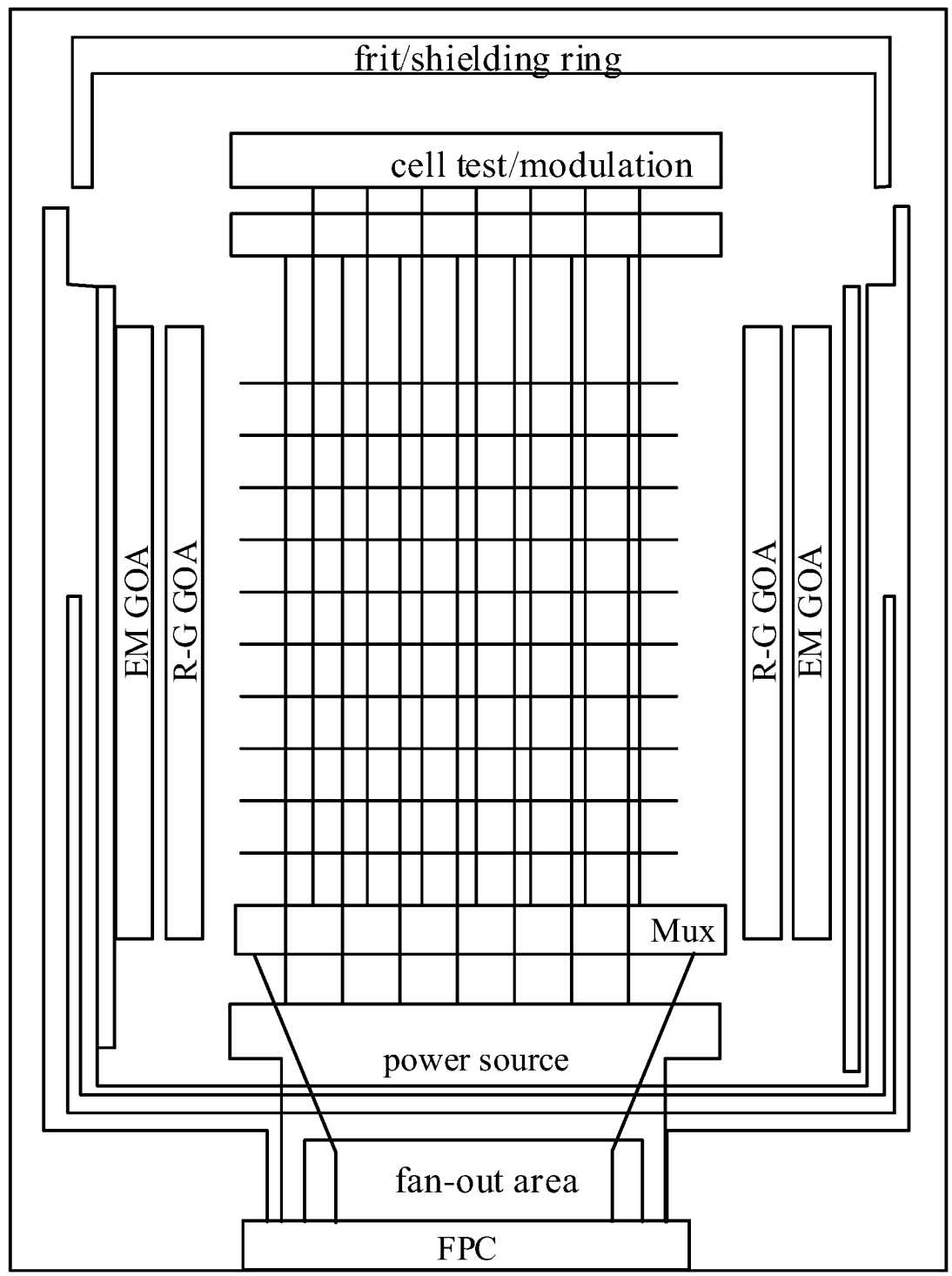
FIG. 11 is a schematic diagram of a structure of a display device according to an embodiment of the present disclosure.

Optionally, FIG. 10 is a schematic diagram of a structure of a pixel drive circuit 30 according to an embodiment of the present disclosure. Referring to FIG. 10, the pixel drive circuit 30 may include 6 transistors in total, from a seventh transistor T7 to a twelfth transistor T12, and a capacitor C2. The pixel drive circuit 30 is connected to a gate line Gate, a data line Data, a control signal line Reset, a first light-emitting signal line EM1 and a second light-emitting line EM2, respectively. Signals loaded on the gate line Gate and the control signal line Reset may be provided by a reset-gate drive circuit (Reset-Gate GOA) in the display device. Signals loaded on the first light-emitting signal line EM1 and the second light-emitting line EM2 may be provided by the light-emitting gate drive circuit EM GOA in the display device. Signals loaded on the data line Data may be provided by a flexible printed circuit (FPC). FIG. 11 is a schematic diagram of a structure of a display device. In FIG. 11, the positions of a reset-gate drive circuit R-G GOA, a light-emitting drive circuit EM GOA, an FPC, a fan-out area, and a multiplexer Mux, a power source, a cell test/modulation, and a frit/shielding ring in the display device are shown.

As shown in FIG. 10, the pixel drive circuit 30 includes: a seventh transistor T7, an eighth transistor T8, a ninth transistor T9, a tenth transistor T10, an eleventh transistor T11 and a twelfth transistor T12.

The gate electrode of the seventh transistor T7 is connected to a control signal line Reset, the first electrode of the seventh transistor T7 is connected to a second power source terminal VGL, and the second electrode of the seventh transistor T7 is connected to a first node M1.

The gate electrode of the eighth transistor T8 is connected to the first node M1, the first electrode of the eighth transistor T8 is connected to a first power source terminal VGH, and the second electrode of the eighth transistor T8 is connected to a third node M3.

The gate electrode of the ninth transistor T9 is connected to a gate line Gate, and the first electrode of the ninth transistor T9 is connected to a data line Data, the second electrode of the ninth transistor T9 is connected to a second node M2, and the second node M2 is coupled with the third node M3.

The gate electrode of the tenth transistor T10 is connected to the gate line Gate, the first electrode of the tenth transistor T10 is connected to the third node M3, and the second electrode of the tenth transistor T10 is connected to the first node M1.

The gate electrode of the eleventh transistor T11 is connected to a second light-emitting signal line EM2, the first electrode of the eleventh transistor T11 is connected to the first power source terminal VGH, and the second electrode of the eleventh transistor T11 is connected to the second node M2.

The gate electrode of the twelfth transistor T12 is connected to a first light-emitting signal line EM1, the first electrode of the twelfth transistor T12 is connected to the third node M3, and the second electrode of the twelfth transistor T12 is connected to the light-emitting sub-circuit 20.

The seventh transistor T7, the eighth transistor T8, the ninth transistor T9, the tenth transistor T10, the eleventh transistor T11 and the twelfth transistor T12 have the same polarity. For example, all of the seventh transistor T7, the eighth transistor T8, the ninth transistor T9, the tenth transistor T10, the eleventh transistor T11 and the twelfth transistor T12 may be P-type transistors.

Optionally, as shown in FIG. 10, the pixel drive circuit 30 may further include: a control capacitor C2. A terminal of the control capacitor C2 is connected to the second node M2, and the other terminal of the control capacitor C2 is connected to the first node M1. The coupling of the second node M2 and the third node M3 can be achieved by controlling the control capacitor C2.

With continued reference to FIG. 10, the operating process of the pixel drive circuit 30 may include: a reset phase, a charging phase, a compensating phase and a light-emitting phase. Here, the working principles of the four phases are illustrated by taking an example in which all of the transistors in the pixel drive circuit 30 are P-type transistors.

In the reset phase, the potential of the reset signal loaded on the control signal line Reset is the second potential. The seventh transistor T7 is turned on under the control of the reset signal. The second power source terminal VGL provides the second power source signal from the second power source terminal VGL to the first node M1 through the seventh transistor T7, to reset the first node M1. At this time, the eighth transistor T8 is turned off under the control of the first node M1.

In the charging phase, the potential of the gate signal loaded on the gate line Gate is the second potential, and the potential of the data line Vdata loaded on the data line Data is the second potential. The ninth transistor T9 is turned on under the control of the gate signal. The data line Data inputs a data signal to the second node M2 through the ninth transistor T9, such that the potential of the second node M2 decreases. At this time, the voltage of the first node M1 decreases to be Vdata under the coupling of the control capacitor C2. The eighth transistor T8 is turned on under the driving of the first node M1. The first power source terminal VGH provides the first power source signal from the first power source terminal VGH to the third node M3 through the eighth transistor T8. In addition, the tenth transistor T10 is turned on under the control of the gate signal. The third node M3 inputs the first power source signal to the first node M1 through the tenth transistor T10, such that the potential of the first node M1 is controlled to be Vdd−Vth. Vdd is the voltage amplitude of the first power source signal, and Vth is the turning-on voltage amplitude of the tenth transistor T10.

In the compensating phase, the potential of the second light-emitting signal loaded on the second light-emitting signal line EM2 is the second potential. The eleventh transistor T11 is turned on under the control of the second light-emitting signal. The first power source terminal VGH inputs the first power source signal to the second node M2 through the eleventh transistor T11, such that the potential of the second node M2 becomes Vdd. Correspondingly, the potential of the first node M1 becomes 2Vdd−Vdata−Vth under the coupling of the control capacitor C2.

In the light-emitting phase, the potential of the first light-emitting signal loaded on the first light-emitting signal line EM1 is the second potential. The twelfth transistor T12 is turned on under the control of the first light-emitting signal, and the potential of the first node M1 is maintained to be 2Vdd−Vdata−Vth. The eighth transistor T8 is turned on under the driving of the first node. The first power source terminal VGH inputs the first power source signal to the OLED through the eighth transistor T8 and the twelfth transistor T12, so as to control the OLED to emit light. At this time, the magnitude I of current flowing through the OLED is $0.5*K*(Vgs-Vth)^2=0.5*K*[Vdd-(2Vdd-Vdata-Vth)-Vth]^2=0.5*K*[Vdd+Vdata]^2$. It can be known from this formula that the magnitude of current flowing through the OLED is unrelated to Vth. Therefore, when the pixel drive circuit 30 is implemented by the circuit shown in FIG. 10, the influence of the variants Vth generated by the manufacturing process on the magnitude of current may be eliminated. Thus, the OLED emits light more stably.

Figure 12:
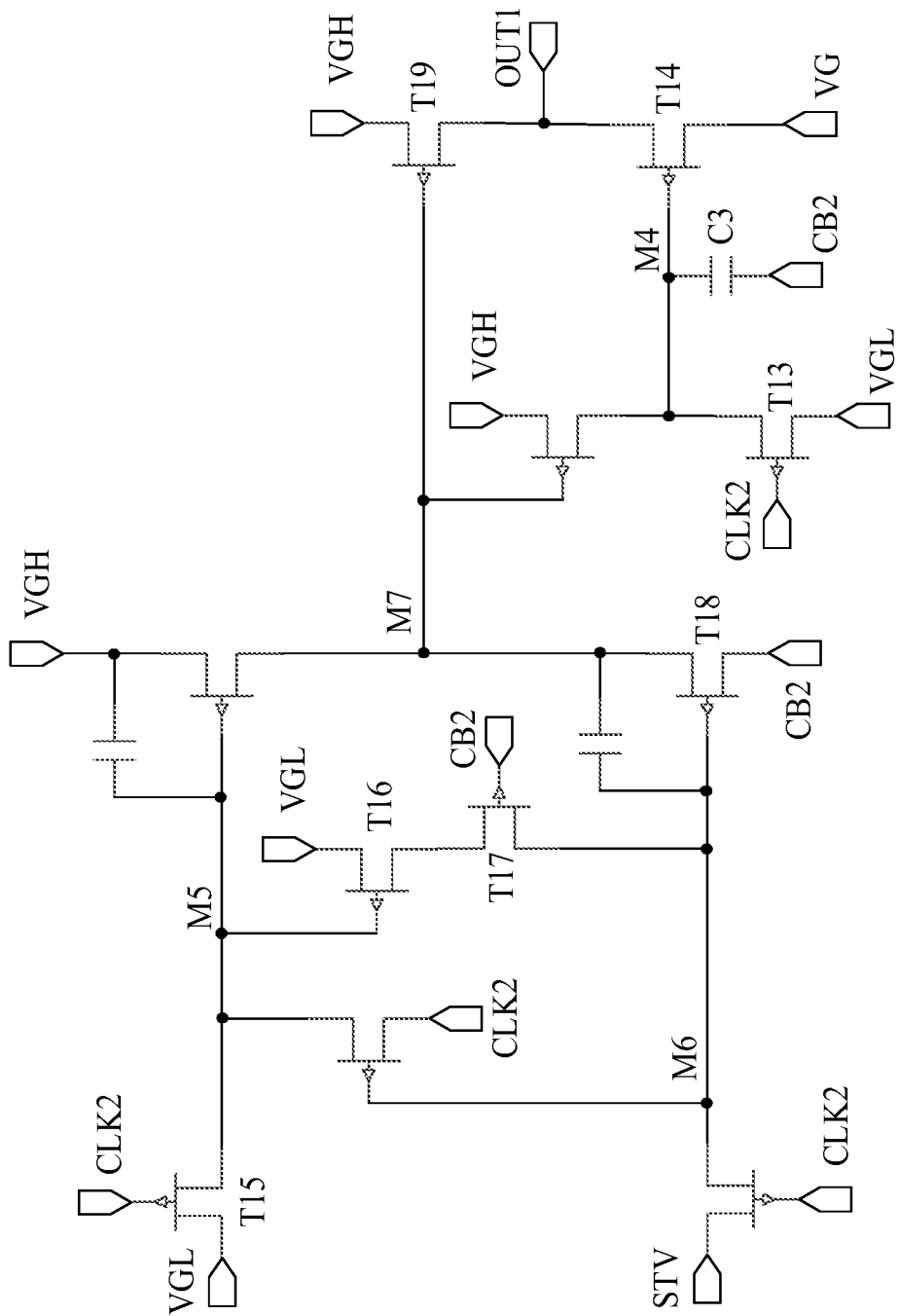
FIG. 12 is a schematic diagram of a structure of a circuit for generating a first light-emitting signal according to an embodiment of the present disclosure.
Figure 13:
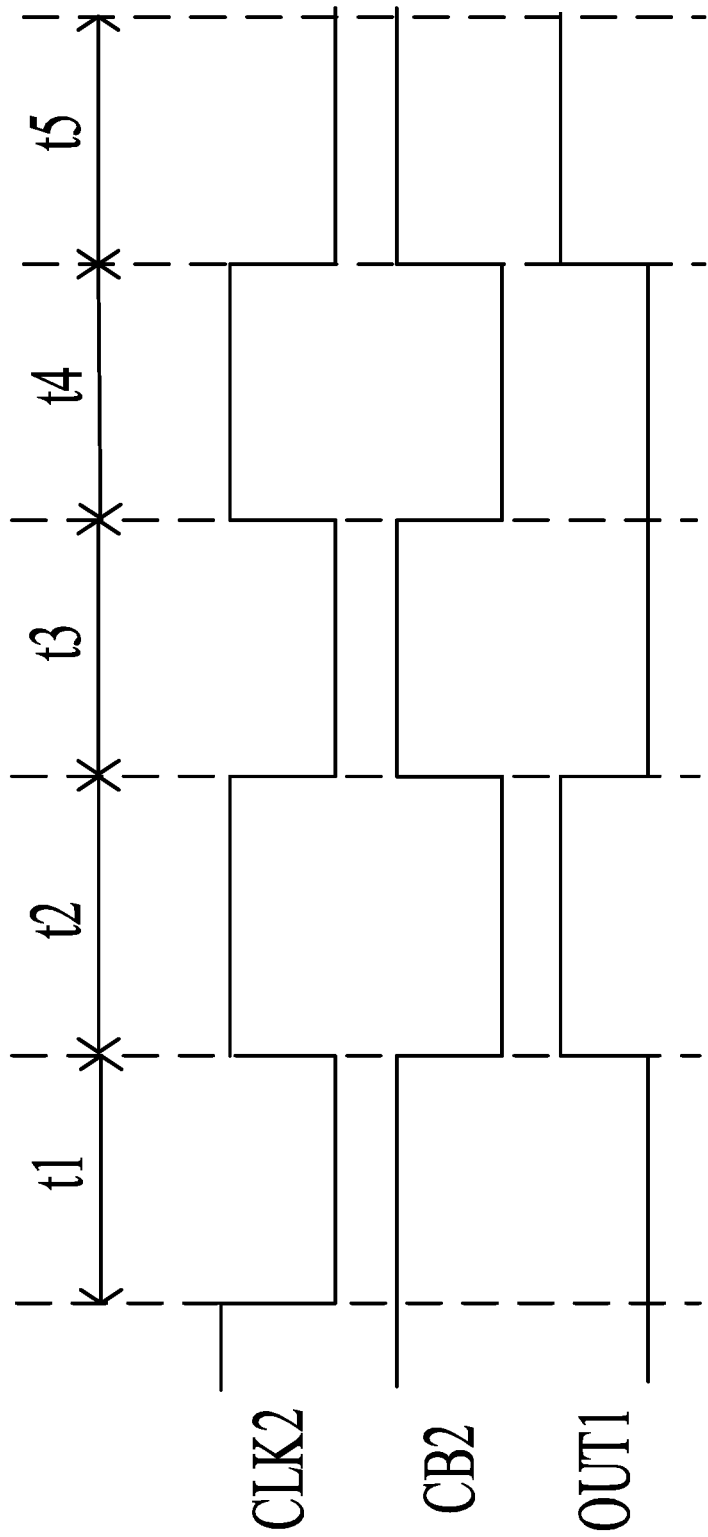
FIG. 13 is a timing sequence diagram of a driving process of a circuit for generating a first light-emitting signal in a driving process according to an embodiment of the present disclosure.

In addition, according to the working principle of the light-emitting phase of the pixel drive circuit 30, it can be known that the OLED may be controlled to emit light or not by controlling the first light-emitting signal loaded on the first light-emitting signal line EM1. Exemplarily, FIG. 12 is a schematic diagram of a structure of a circuit for generating a first light-emitting signal according to an embodiment of the present disclosure. FIG. 13 is a timing sequence diagram of a circuit for generating a first light-emitting signal in a driving process. In FIG. 12, the signal output from the EM output terminal OUT1 is used to be loaded on the first light-emitting signal line EM1.

As shown in FIG. 12 and FIG. 13, the driving process of the circuit for generating the first light-emitting signal includes: a touch phase 1, a touch phase 2, a touch phase 3, a touch phase 4 and a touch phase 5. Here, the operating principles of the five working phases are illustrated by taking as an example that all of the transistors in the circuit are P-type transistor.

In the touch phase 1, the potential of a clock signal output by a clock signal terminal CLK2 is the second potential, the potential of the second power source signal output by the second power source terminal VGL is the second potential, and the potential of the third power source signal output by the third power source terminal VG is the second potential. The thirteenth transistor T13 is turned on under the control of the clock signal. The second power source terminal VGL inputs the second power source signal to the fourth node M4 through the thirteenth transistor T13. The fourteenth transistor T14 is turned on under the driving of the fourth node M4. The third power source terminal VG inputs the third power source signal at the second potential to the EM output terminal OUT1 through the fourteenth transistor T14. When the third power source signal at the second potential which is input to the EM output terminal OUT1 is loaded on the first light-emitting signal line EM1, the OLED can be controlled to emit light.

In addition, the potential of the first power source signal output by the first power source terminal VGH is the first potential, and the potential of the second power source signal output by the second power source terminal VGL is the second potential. The fifteenth transistor T15 is turned on under the control of the clock signal. The second power source terminal VGL inputs the second power source signal to the fifth node M5 through the fifteenth transistor T15, such that the potential of the fifth node M5 changes into the second potential.

In the touch phase t2, the potential of the first power source signal output by the first power source terminal VGH is the first potential, and the potential of the second power source signal output by the second power source terminal VGL is the second potential. The fifth node M5 maintains the second potential, and the potential of the touch signal output by the touch signal terminal CB2 is the second potential. The sixteenth transistor T16 is turned on under the driving of the fifth node M5, and the seventeenth transistor T17 is turned on under the control of the touch signal. The second power source terminal VGL inputs the second power source signal to the sixth node M6 through the sixteenth transistor T16 and the seventeenth transistor T17. The eighteenth transistor T18 is turned on under the driving of the sixth node M6. The control signal terminal CB2 inputs a control signal to the seventh node M7 through the eighteenth transistor T18. The nineteenth transistor T19 is turned on under the driving of the seventh node M17. The first power source terminal VGH inputs the first power signal to the EM output terminal OUT1 through the nineteenth transistor T19. When the first power source signal at the first potential which is input to the ME output terminal OUT1 is loaded on the first light-emitting signal line EM1, the OLED can be controlled to stop emitting light.

In the touch phase t3, the potential of the clock signal output by the clock signal terminal CLK2 is the second potential, the potential of the second power source signal output by the second power source terminal VGL is the second potential, and the potential of the third power source signal output by the third power source terminal VG is the second potential. The thirteenth transistor T13 is turned on under the control of the clock signal. The second power source terminal VGL inputs the second power source signal to the fourth node M4 through the thirteenth transistor T13. The fourteenth transistor T14 is turned on under the driving of the fourth node M4. The third power source terminal VG inputs a third power source signal at the second potential to the EM output terminal OUT1 through the fourteenth transistor T14. When the third power source signal at the second potential which is input to the EM output terminal OUT1 is loaded on the first light-emitting signal line EM1, the OLED can be controlled to emit light.

In the touch phase t4, the potential of the control signal output by the control signal terminal CB2 is the second potential, and the potential of the third power source signal output by the third power source terminal VG is the second potential. After the touch phase t3, the fourth node M4 maintains at the second potential, and under the coupling of the pull-up capacitor C3, the potential of the fourth nodes M 4 is further pulled down in the touch phase t4. At this time, the fourteenth transistor T14 is turned on under the driving of the fourth node M4. The third power source terminal VG inputs the third power source signal at the second potential which is input to the EM output terminal OUT1 through the fourteenth transistor T14. When the third power source signal at the second potential which is input to the EM output terminal OUT1 is loaded on the first light-emitting signal line EM1, the OLED can be controlled to emit light.

In the touch phase t5, the potential of the clock signal output by the clock signal terminal CLK2 is the second potential, the potential of the second power source signal output by the second power source terminal VGL is the second potential, and the potential of the third power source signal output by the third power source terminal VG is the first potential. The thirteenth transistor T13 is turned on under the control of the clock signal. The second power source terminal VGL inputs the second power source signal to the fourth node M4 through the thirteenth transistor T13. The fourteenth transistor T14 is turned on under the driving of the fourth node M4. The third power source terminal VG inputs the third power source signal at the first potential to the EM output terminal OUT1 through the fourteenth transistor T14. When the third power source signal at the first potential which is input to the EM output terminal OUT1 is loaded on the first light-emitting signal line EM1, the OLED can be controlled to emit light.

In summary, with the pixel unit in the embodiments of the present disclosure, the pressure signal is detected by the pressure detecting sub-circuit in the pixel control circuit, and the first power source signal is provided to the light-emitting sub-circuit by controlling the switching sub-circuit when the pressure signal is detected such that the light-emitting sub-circuit emits light to provide light for fingerprint detection. Compared with the related art, the light-emitting sub-circuit can be controlled to emit light when the surface of the display panel corresponding to the pixel unit is pressed by a finger, and the emitting of light by the light-emitting sub-circuit does not need to be controlled by the touch IC, thereby greatly improving the speed of fingerprint detection.

The embodiments of the present disclosure provide a display substrate, including a plurality of pixel units in the embodiments of the present disclosure.

The embodiments of the present disclosure provide a display device, including the display substrate in the embodiments of the present disclosure. The display device may be: any products or components with a display function, such as a liquid crystal panel, an electronic paper, an Organic Light-Emitting Diode (OLED) panel, a mobile phone, a tablet computer, a TV, a display, a laptop computer, a digital photo frame, a navigator, etc.

The embodiments of the present disclosure provide a storage medium having computer programs stored therein. The computer programs, when executed by a process, implement the control method of the pixel control circuit in the embodiments of the present disclosure.

The foregoing descriptions are only exemplary embodiments of the present disclosure, and are not intended to limit the present disclosure. Within the spirit and principles of the disclosure, any modifications, equivalent substitutions, improvements, etc., shall fall within the protection scope of the appended claims of the present disclosure.

What is claimed is:

1. A pixel control circuit applied in a pixel unit, comprising: a pressure detecting sub-circuit and a switching sub-circuit;
   wherein the pressure detecting sub-circuit is connected to a control node, and configured to control a potential of the control node to be a first potential when a pressure signal is detected; and
   the switching sub-circuit is connected to a first power source terminal, a light-emitting sub-circuit in the pixel unit and the control node respectively, and configured to provide a first power source signal from the first power source terminal to the light-emitting sub-circuit when the potential of the control node is the first potential;
   wherein the switching sub-circuit is further connected to a second power source terminal, and the switching sub-circuit comprises one of the following:
   a first transistor, a second transistor, a third transistor and a fourth transistor; a gate electrode of the first transistor is connected to the control node, a first electrode of the first transistor is connected to the first power source terminal, and a second electrode of the first transistor is connected to a gate electrode of the third transistor; a gate electrode of the second transistor is connected to the control node, a first electrode of the second transistor is connected to a second power source terminal, and a second electrode of the second transistor is connected to the gate electrode of the third transistor; a first electrode of the third transistor is connected to the second electrode of the second transistor, and a second electrode of the third transistor is connected to a gate electrode of the fourth transistor; a first electrode of the fourth transistor is connected to the first power source terminal, and a second electrode of the fourth transistor is connected to the light-emitting sub-circuit; and the first transistor, the third transistor and the fourth transistor have the same polarity, and the first transistor and the second transistor have opposite polarities; and
   a first transistor, a fifth transistor, a third transistor and a fourth transistor; a gate electrode of the first transistor is connected to the control node, a first electrode of the first transistor is connected to the first power source terminal, and a second electrode of the first transistor is connected to a gate electrode of the third transistor; a gate electrode and a first electrode of the fifth transistor are connected to the second power source terminal, and a second electrode of the fifth transistor is connected to the gate electrode of the third transistor; a first electrode of the third transistor is connected to the second electrode of the fifth transistor, and a second electrode of the third transistor is connected to a gate electrode of the fourth transistor; a first electrode of the fourth transistor is connected to the first power source terminal, and a second electrode of the fourth transistor is connected to the light-emitting sub-circuit; and the first transistor, the fifth transistor, the third transistor and the fourth transistor have the same polarity.

2. The pixel control circuit according to claim 1, further comprising: a reset sub-circuit, wherein the reset sub-circuit is connected to a reset signal terminal and the control node respectively, and configured to control the potential of the control node to be a second potential under the control of a reset signal from the reset signal terminal.

3. The method of claim 1, The pixel control circuit according to claim 2, wherein the switching sub-circuit is further configured to prohibit from providing the first power source signal to the light-emitting sub-circuit under the control of the first power source signal when the potential of the control node is the second potential.

4. The pixel control circuit according to claim 1, wherein the pressure detecting sub-circuit comprises a pressure sensor, a terminal of the pressure sensor is connected to the control node and the other terminal of the pressure sensor is connected to a second power source terminal.

5. The pixel control circuit according to claim 2, wherein the reset sub-circuit comprises: a sixth transistor;
   a gate electrode of the sixth transistor is connected to the reset signal terminal, a first electrode of the sixth transistor is connected to a second power source terminal, and a second electrode of the sixth transistor is connected to the control node.

6. The pixel control circuit according to claim 1, further comprising: a capacitor;
   wherein a terminal of the capacitor is connected to the control node, and the other terminal of the capacitor is connected to a second power source terminal.

7. The pixel control circuit according to claim 1, comprising: a pressure sensor, a first transistor, a second transistor, a third transistor, a fourth transistor, a sixth transistor, and a capacitor;
   wherein a terminal of the pressure sensor is connected to the control node, and the other terminal of the pressure sensor is connected to a second power source terminal;
   a gate electrode of the first transistor is connected to the control node, a first electrode of the first transistor is connected to the first power source terminal, and a second electrode of the first transistor is connected to a gate electrode of the third transistor;
   a gate electrode of the second transistor is connected to the control node, a first electrode of the second transistor is connected to the second power source terminal, and a second electrode of the second transistor is connected to the gate electrode of the third transistor;
   a first electrode of the third transistor is connected to the second electrode of the second transistor, and a second electrode of the third transistor is connected to a gate electrode of the fourth transistor;
   a first electrode of the fourth transistor is connected to the first power source terminal, and a second electrode of the fourth transistor is connected to the light-emitting sub-circuit;
   a gate electrode of the sixth transistor is connected to a reset signal terminal, a first electrode of the sixth transistor is connected to the second power source terminal, and a second electrode of the sixth transistor is connected to the control node;

a terminal of the capacitor is connected to the control node, and the other terminal of the capacitor is connected to the second power source terminal; and the first transistor, the third transistor and the fourth transistor have the same polarity, and the first transistor and the second transistor have opposite polarities.

8. The pixel control circuit according to claim 1, comprising: a pressure sensor, a first transistor, a fifth transistor, a third transistor, a fourth transistor, a sixth transistor, and a capacitor;

wherein a terminal of the pressure sensor is connected to the control node, and the other terminal of the pressure sensor is connected to a second power source terminal;

a gate electrode of the first transistor is connected to the control node, a first electrode of the first transistor is connected to the first power source terminal, and a second electrode of the first transistor is connected to a gate electrode of the third transistor;

a gate electrode and a first electrode of the fifth transistor are connected to the second power source terminal, and a second electrode of the fifth transistor is connected to the gate electrode of the third transistor;

a first electrode of the third transistor is connected to the second electrode of the fifth transistor, and a second electrode of the third transistor is connected to a gate electrode of the fourth transistor;

a first electrode of the fourth transistor is connected to the first power source terminal, and a second electrode of the fourth transistor is connected to the light-emitting sub-circuit;

a gate electrode of the sixth transistor is connected to a reset signal terminal, a first electrode of the sixth transistor is connected to the second power source terminal, and a second electrode of the sixth transistor is connected to the control node;

a terminal of the capacitor is connected to the control node, and the other terminal of the capacitor is connected to the second power source terminal; and the first transistor, the fifth transistor, the third transistor and the fourth transistor have the same polarity.

9. A control method of a pixel control circuit, for controlling a pixel control circuit comprising a pressure detecting sub-circuit and a switching sub-circuit, the method comprising:

in a fingerprint detection phase, detecting a pressure signal for fingerprint detection by the pressure detecting sub-circuit, controlling a potential of a control node to be a first potential according to the pressure signal by the pressure detecting sub-circuit, and providing, by the switching sub-circuit, a first power source signal from a first power source terminal to a light-emitting sub-circuit under the control of the control node, a potential of the first power source signal being the first potential;

wherein the switching sub-circuit is further connected to a second power source terminal, and the switching sub-circuit comprises one of the following:

a first transistor, a second transistor, a third transistor and a fourth transistor; a gate electrode of the first transistor is connected to the control node, a first electrode of the first transistor is connected to the first power source terminal, and a second electrode of the first transistor is connected to a gate electrode of the third transistor; a gate electrode of the second transistor is connected to the control node, a first electrode of the second transistor is connected to a second power source terminal, and a second electrode of the second transistor is connected to the gate electrode of the third transistor; a first electrode of the third transistor is connected to the second electrode of the second transistor, and a second electrode of the third transistor is connected to a gate electrode of the fourth transistor; a first electrode of the fourth transistor is connected to the first power source terminal, and a second electrode of the fourth transistor is connected to the light-emitting sub-circuit; and the first transistor, the third transistor and the fourth transistor have the same polarity, and the first transistor and the second transistor have opposite polarities; and a first transistor, a fifth transistor, a third transistor and a fourth transistor; a gate electrode of the first transistor is connected to the control node, a first electrode of the first transistor is connected to the first power source terminal, and a second electrode of the first transistor is connected to a gate electrode of the third transistor; a gate electrode and a first electrode of the fifth transistor are connected to the second power source terminal, and a second electrode of the fifth transistor is connected to the gate electrode of the third transistor; a first electrode of the third transistor is connected to the second electrode of the fifth transistor, and a second electrode of the third transistor is connected to a gate electrode of the fourth transistor; a first electrode of the fourth transistor is connected to the first power source terminal, and a second electrode of the fourth transistor is connected to the light-emitting sub-circuit; and the first transistor, the fifth transistor, the third transistor and the fourth transistor have the same polarity.

10. The control method of claim 9, wherein the pixel control circuit further comprises: a reset sub-circuit, the control method further comprising:

in a reset phase, a potential of a reset signal output from a reset signal terminal being a second potential and the potential of the first power source signal being the first potential, controlling, by the reset sub-circuit, the potential of the control node to be the second potential under the control of the reset signal.

11. The control method of claim 10, further comprising: prohibiting, by the switching sub-circuit, from providing the first power source signal to the light-emitting sub-circuit under the control of the control node and the first power source signal.

* * * * *